United States Patent [19]
Nitta

[11] Patent Number: 5,229,796
[45] Date of Patent: Jul. 20, 1993

[54] ATTACHABLE EYEGLASSES

[75] Inventor: Yukuo Nitta, Fukui, Japan

[73] Assignee: Seelex Kabushiki Kaisha, Fukui, Japan

[21] Appl. No.: 599,636

[22] Filed: Oct. 18, 1990

[30] Foreign Application Priority Data

Oct. 19, 1989 [JP] Japan ............................. 1-123013[U]
Oct. 19, 1989 [JP] Japan ............................. 1-123014[U]
May 9, 1990 [JP] Japan ................................ 2-120490

[51] Int. Cl.⁵ .................................................. G02C 5/02
[52] U.S. Cl. ...................................... 351/130; 351/123; 351/111; 351/47; 351/57
[58] Field of Search ....................... 351/41, 47, 44, 57, 351/111, 123, 130

[56] References Cited

U.S. PATENT DOCUMENTS

2,547,467  4/1951  hurst .................................. 351/130
4,952,043  8/1990  Werner et al. ..................... 351/47
4,986,649  1/1991  Smith ................................. 351/130

Primary Examiner—Rodney B. Bovernick
Assistant Examiner—Hugn Xuan Dang
Attorney, Agent, or Firm—Staas & Halsey

[57] ABSTRACT

This invention is directed to attachable eyeglasses in which a brow bracket contacts a wearer's forehead to partly absorb the weight of the attachable eyeglasses. The attachable eyeglasses fit over normally worn eyeglasses. A wide and large front frame is formed in order to conceal the normally worn eyeglasses. By adopting a device having wide temple pieces, a fastener holds the normally worn eyeglasses and the attachable eyeglasses together. The attachable eyeglasses and normal eyeglasses can be worn in a pleasant manner without incurring damage or scratches.

4 Claims, 10 Drawing Sheets

5,229,796

ATTACHABLE EYEGLASSES

BACKGROUND OF THE INVENTION

This invention relates to attachable eyeglasses which can be worn over normal eyeglasses.

Normal eyeglasses are worn for recovery of poor eye sight. Other special eyeglasses are used, for example, for the protection against glare and also for the protection of human eye itself. When a person wearing the normal eyeglasses wants to use other types of eyeglasses for protection against glare, various problems occur.

One who wears normal eyeglasses obtains a pair for correcting his or her eys sight. The eyeglasses also reflect that person's own tastes. In order to make eyeglasses which can be equipped both for eyesight correction and, for example, sunglasses, is very expensive. Even if one can afford this type of eyeglass, the manufacturer may run into difficulty in producing such a lens. In theory and technically, it is possible to produce such a lens, but in reality, such a job is difficult.

When a person who wears eyeglasses wants to use special eyeglasses for, for example, glare protection, first normal eyeglasses are taken off and then the sunglasses are put on. The sunglasses cannot ensure normal eye sight unless they are presecription sunglasses.

In view of these situations, "clip on glasses" are used. "Clip on glasses" are equipped with a front frame which holds glare preventive lenses and are hooked onto normal eyeglasses with a clip, when required. Thus, the wearer has both normal eyeglasses and other purpose glasses simultaneously. The prior art, however, has the following defects: (1) extra weight of the "clip on glasses" is added to the normal eyeglasses, and as a result, a total weight of almost two pairs of eyeglasses causes an oppressive sensation to the wearer; (2) when the sizes and shapes between the normal eyeglasses and the "clip on glasses" are different, this situation results in an ugly and odd look; and (3) the contact between the normal eyeglasses and the "clip on glasses" causes the scratches or damage to one or both of lenses.

SUMMARY OF THE INVENTION

A main object of the present invention is to provide attachable eyeglasses which fit comfortably and correctly over normally worn eyeglasses without being odd looking and ugly.

Another object of the present invention is to provide attachable eyeglasses wherein any extra weight is dispersed properly in various directions so as not to invite a sense of incongruity to the wearer when worn.

Yet another object of the present invention is to provide attachable eyeglasses wherein scratches and damage caused by contact of each lens between the attachable eyeglasses and the normal eyeglasses are properly prevented.

The above-mentioned objects are obtained by providing an attachable eyeglass front frame which is considerably larger than that of normal eyglasses. The front frame has a brow bracket on an upper end, overhanging the normal eyeglass front frame, extending over the wearer's eye brow and finally contacting the wearer's forehead. The contacting portion of the brow bracket is formed with a soft quality resin for providing a natural bumper effect. A pair of ribs are formed between the brow bracket and the front frame to hold and stabilize the normal eyeglasses. On a temple piece of the attachable eyeglasses, a fastener is provided to hold the temple piece of the normal eyeglasses, or alternatively, the temple piece is formed bigger than that of the normal eyeglasses. Further, when needed, a pair of nose pads is provided below the nose pads of the normal eyeglasses. These features reduce or eliminate the unpleasant feeling to the wearer when worn.

These objects, together with other objects and advantages which will be subsequently apparent, reside in the details of construction and operation as more fully hereinafter described and claimed, reference being had to the accompanying drawings, forming a part hereof, wherein like reference numerals refer to like parts throughout.

BREIF DESCRIPTIONS OF THE DRAWINGS

FIG. 1 is a perspective view of a first embodiment according to the present invention.

FIGS. 2(a) and 2(b) are partly enlarged perspective cut-away views of a fastener according to the prsent invention.

FIGS. 3(a) and 3(b) and FIGS. 4(a) and (b) are also partly enlarged perspective cut-away views of different embodiments for the fastener means, according to the present invention.

Figure 13A:
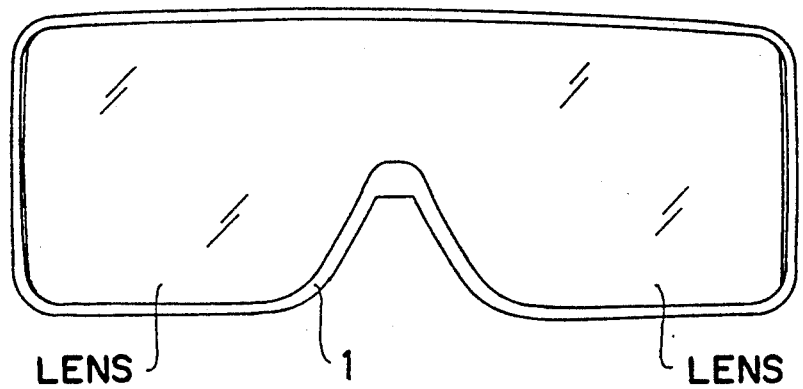
Figure 13B:
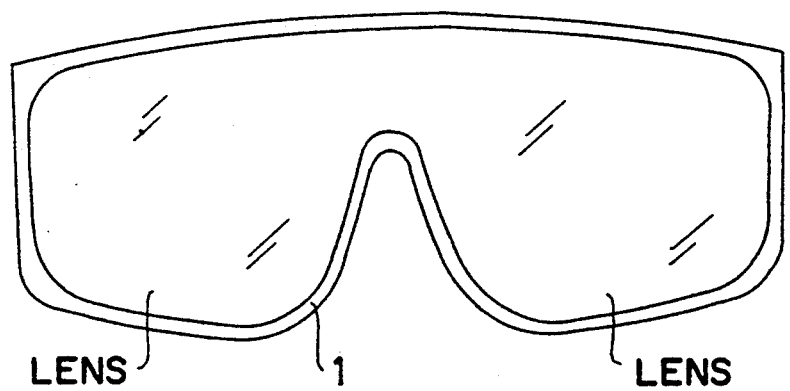

FIGS. 13(a) and 13(b) are explanatory front views of variations of the third embodiment of the present invention.

Figure 14A:
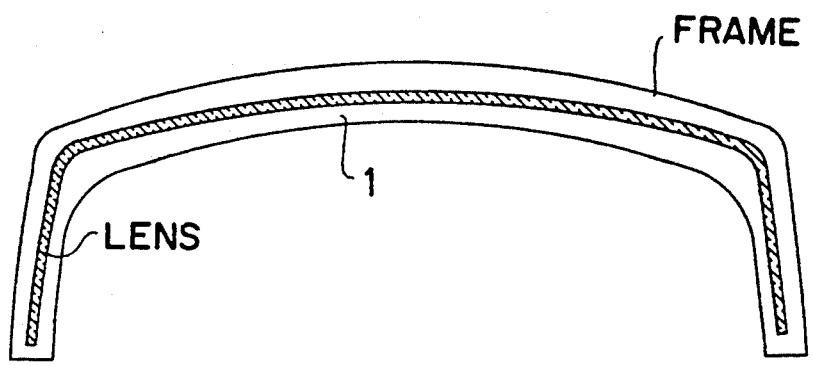
Figure 14B:
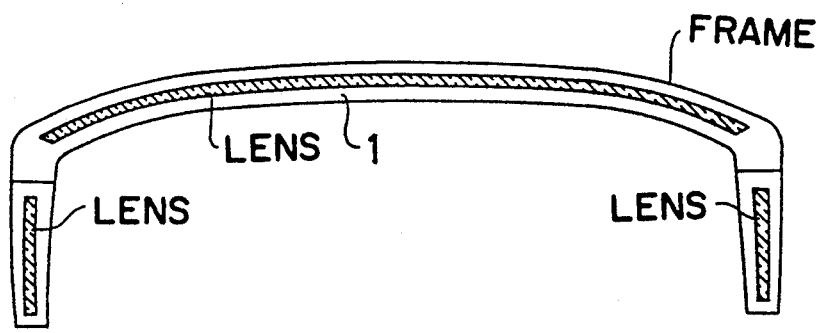

FIGS. 14(a) and 14(b) are top views of another variation of the third embodiment according to the present invention.

DESCRIPTION OF THE PREFERRED EMBODIMENTS

Figure 1:
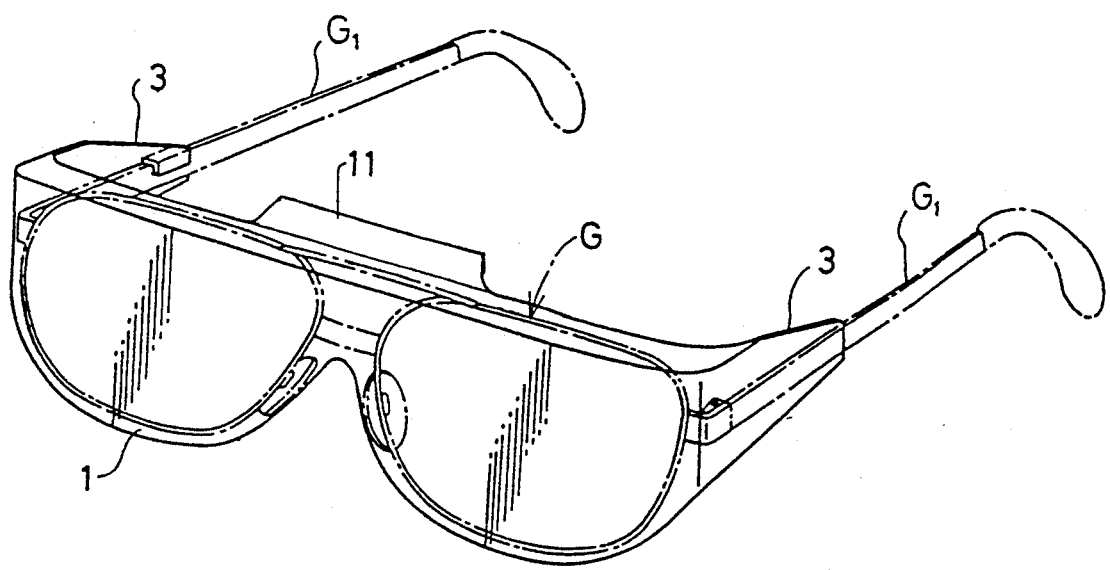
Figure 2A:
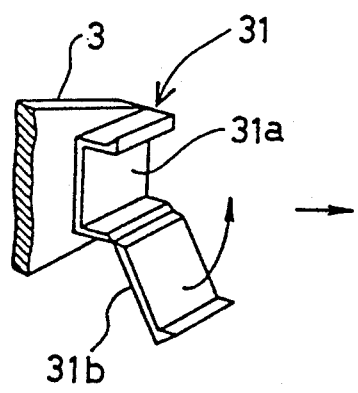

With reference to FIG. 1 and FIGS. 2(a) and (b), the first embodiment will be explained below.

A front frame(1) is produced having dimensions of, for example, 150 millimeters(mm) wide and 65 mm high. The front frame has a curve which curves toward the wearer's face. The front curved is a considerably dull line compared with normal eyeglasses so that the curve line can adapt properly to the worn normal eyeglasses. Acrylic resin lenses having a mirror coating are, for example, implanted within the frame. On the upper part of the front frame(1), a brow bracket(11) is formed as one body extending toward the wear's head. When the attachable eyeglasses are worn over normal eyeglasses, the brow bracket(11) contacts the wearer's forehead whereon the weight of the attachable eyeglasses is partly supported.

Figure 2B:
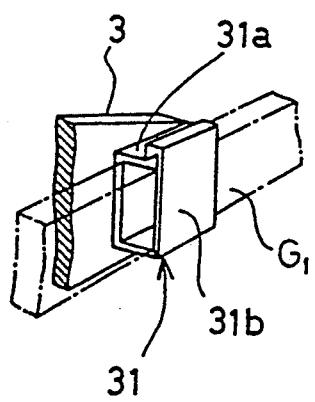
Figure 3A:
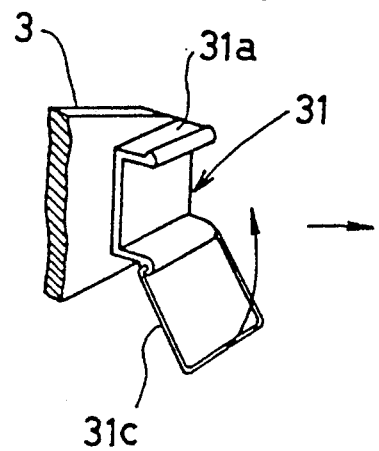
Figure 3B:
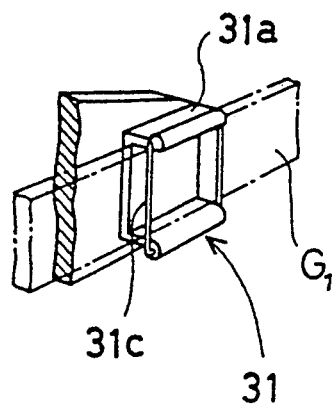
Figure 4A:
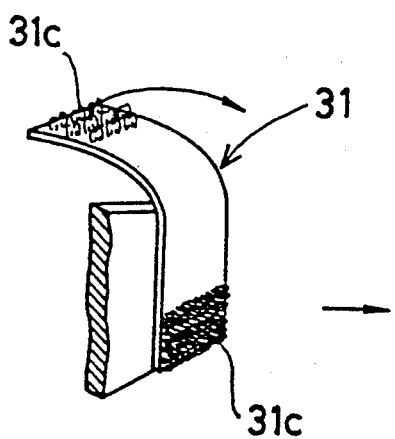
Figure 4B:
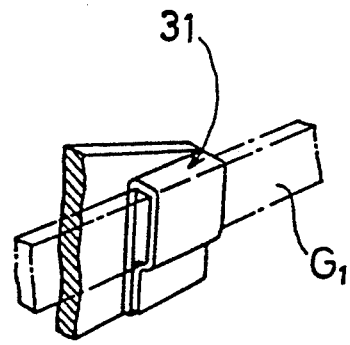

The front frame(1) has side brackets(3) on both ends. The front frame(1) and side brackets(3) are formed as one production. As shown in FIGS. 2(a) and 2(b), on the inner surfaces of the side brackets(3), fastener means(31) are formed facing each other so that the fastener means(31) can tightly hold or release the temples of the normal eyeglasses. This fastener means(31) comprises a thin temple receiver(31a) and a cap(31b). When the cap(31b) is snapped forcibly into the upper end of the fastener means(31), the temple($G_1$) of the normal eyeglasses(G) is correctly and sufficiently locked. In the first embodiment, the fastener means(31) adopts a plastic hook style. But as shown in FIGS. 3(a) and 3(b), metal wire material is also available as well as a magic fastener style(velcro) shown in FIG. 4(a) and 4(b).

Figure 5:
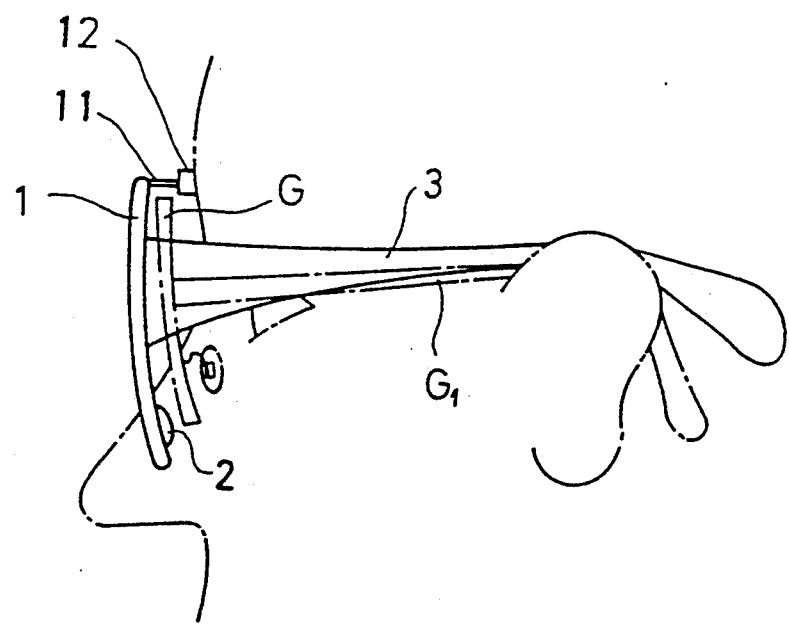
FIG. 5, FIG. 6 and FIG. 7 are a side view, a front view and a top view, respectively, of a second embodiment according to the present invention showing the actual wearing of the attachable eyeglasses of the present invention.
Figure 6:
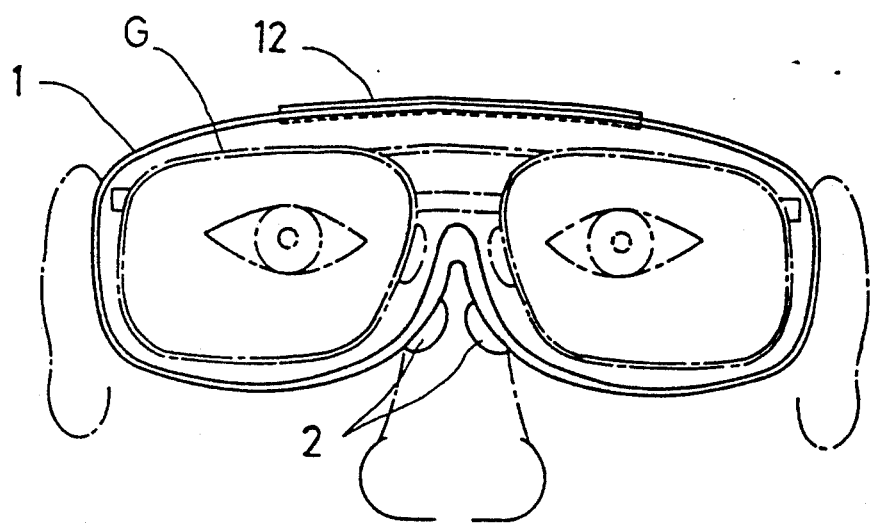
Figure 7:
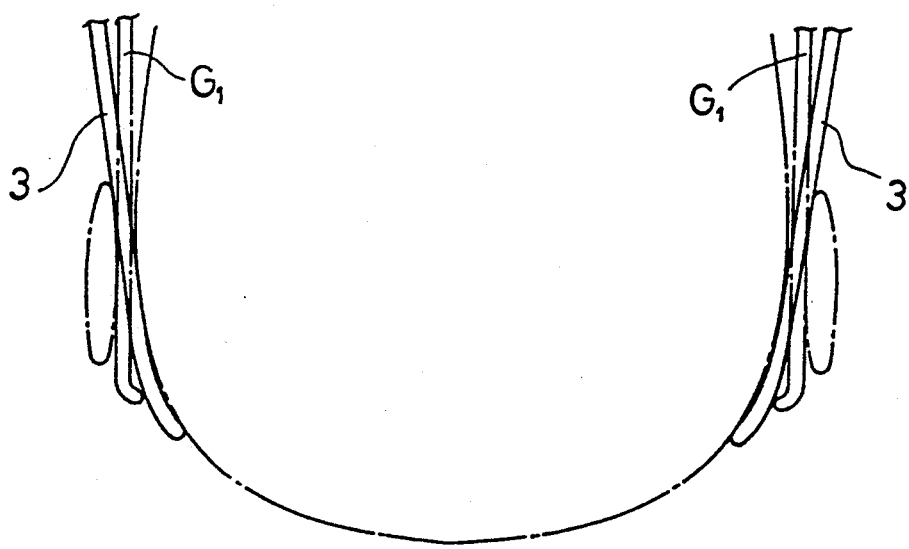
Figure 8:
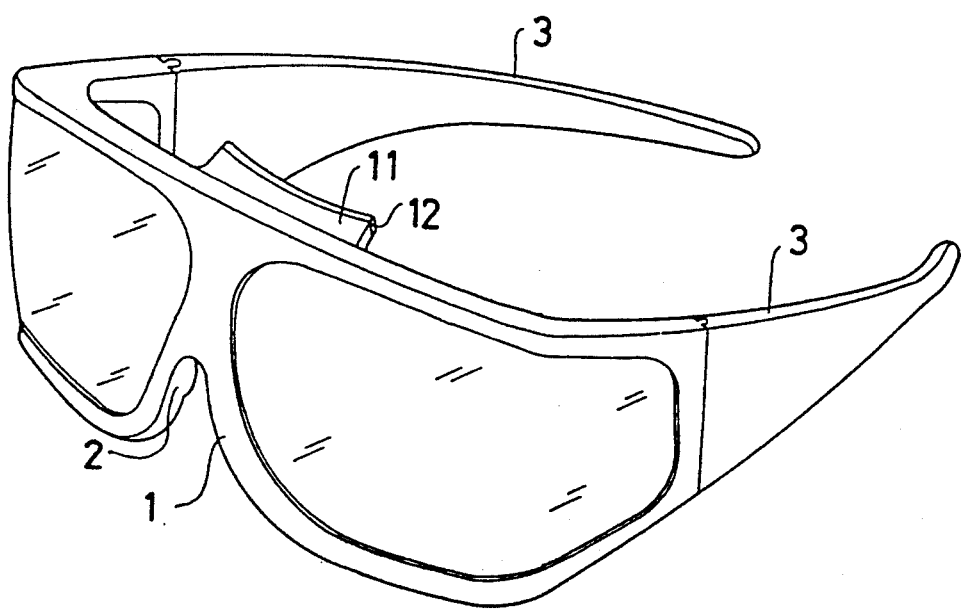
FIG. 8 is a pespective view of a third embodiment according to the present invention.
Figure 9:
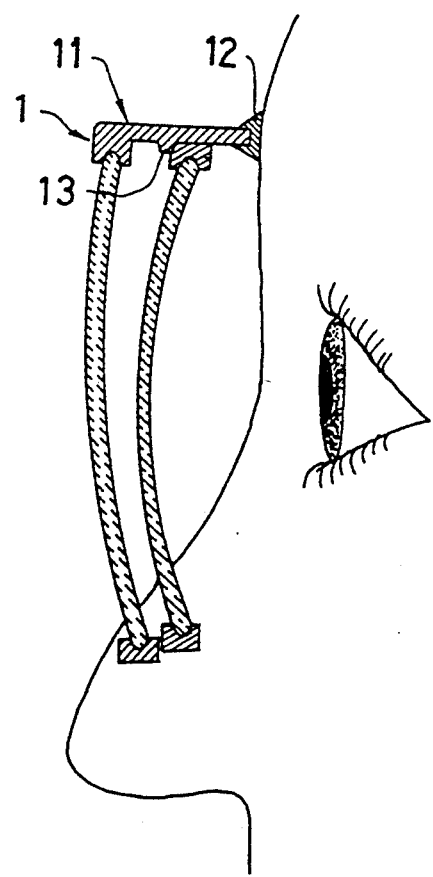
FIG. 9 is a sectional side elevation view for the present invention on an actual wearer.
Figure 10:
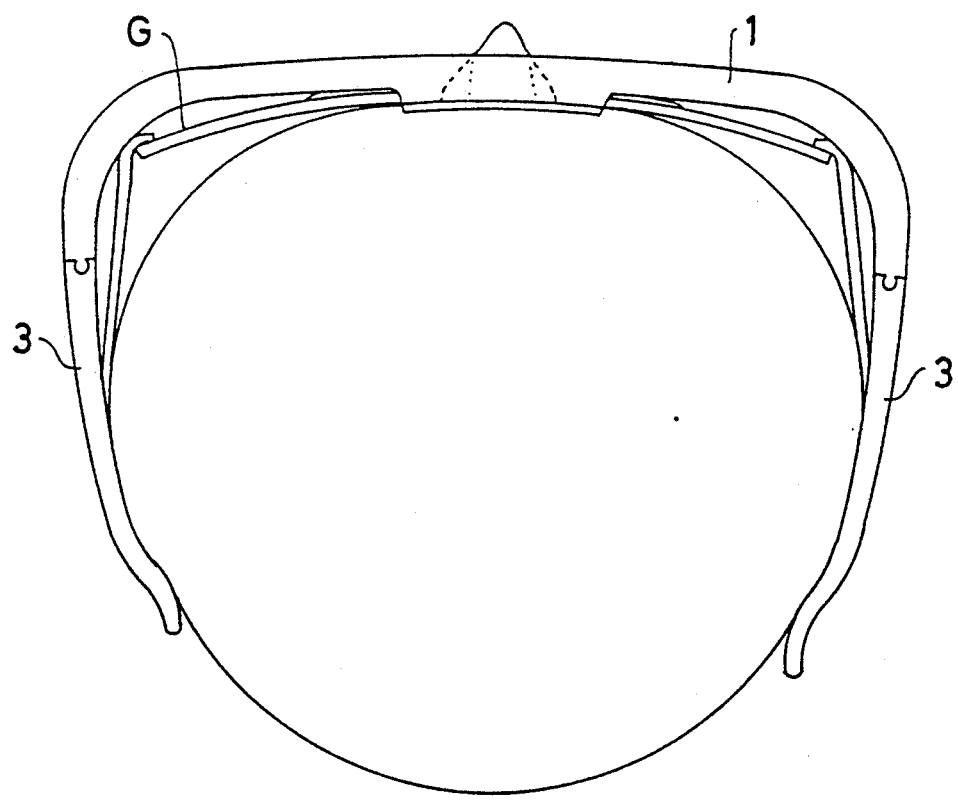
FIG. 10 is a top view of the present invention shown in FIG. 9.
Figure 11:
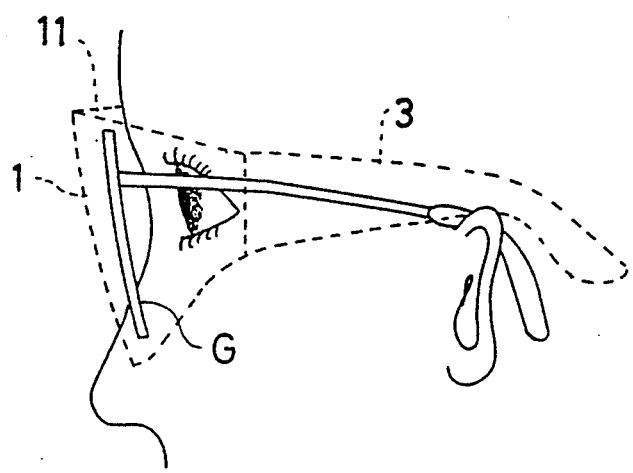
FIG. 11 is a side view of the present invention shown in FIG. 9.

A second embodiment is now explained in accordance with FIG. 5, FIG. 6 and FIG. 7.

The second embodiment is similar to the first embodiment in that the front frame(1) is produced having the same size and same style, and has synthetic resin as the lens material. On the upper end of the front frame(1), a brow bracket(11) is formed as one body with the front frame(1). On the top end of the brow bracket(11), a bumper means(12) is equipped with a silicon rubber pad. When this frame is worn over the normal eyeglasses(G), the bumper means(12) contacts the wearer's forehead, whereon the weight of the attachable eyeglasses is partly supported. Nose pads(2), composed of silicon rubber, and a metal arm are located beneath the center of the front frame(1). These nose pads(2) and nose surface also support partly the weight of the attachable eyeglasses.

Temple pieces(3) are connected with the front frame(1) by hinges(not shown) which allow the temples to fold. When the attachable eyeglasses of the present invention are used, the temple pieces(3) are racked onto a wearer's ears crossing over the temples ($G_1$ and $G_2$) of the normal eyeglasses(G). On the back side(inner side) of the temple piece(3), a recess(not shown) is formed therein so that the temple pieces(3) are stable and will not move.

A third embodiment of the present invention is explained in accordance with FIG. 8, FIG. 9, FIG. 10 and FIG. 11. The third embdiment is similar to the first embodiment in that a front frame(1) is produced having the same size. The style of the third embodiment looks semicylindrical when viewed from above as shown in FIG. 7. On the upper end of the front frame(1), a brow bracket(11) is formed as one body with the front frame(1) and is equipped with bumper means(12) comprising silicon rubber. The brow bracket(11) contacts the wearer's forehead when worn over the normal eyeglasses(G), and it partially supports the weight of the attachable eyeglasses. Beneath the brow bracket(11), a rib(13—FIG. 9) is employed to receive the upper part of the normal eyeglasses(G). The rib(13) ensures the immobility of the normal eyeglasses(G) and the attachable eyeglasses. Nose pads(2) formed by silicon and a metal arm are located beneath the center of the front frame(1). These nose pads(2) are located below those of the normal eyeglasses(G) to partially support the attachable eyeglasses. Temple pieces(3) having a total length of 155 millimeters are connected with the front frame(1) by hinges(not shown) which allow the temple pieces(3) to fold. When the attachable eyeglasses of the present invention are used, the temple pieces(3) hold the temples ($G_1$ and $G_2$) of the normal eyeglasses(G) tightly against the wearer's head from the side face to the back of the wearer's head. this allows both the normal eyeglasses and the attachable eyeglasses to be stably connected.

Figure 12:
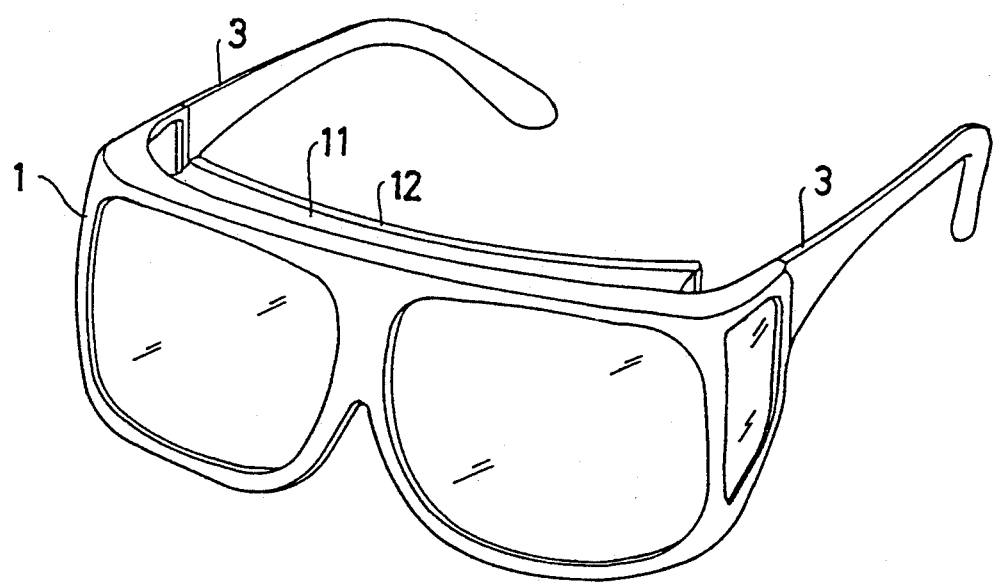
FIG. 12 is a perspective view of a variation in the third embodiment of the present invention.

FIG. 12 is a diagram of a variation in the attachable eyeglasses according to the third embodiment, wherein a side lens in the temple piece is also available.

In the three embodiments which have been explained, the shape of the front frame(1) can have various other shapes such as, for example, a goggle shape as shown in FIGS. 13(a) and 13(b). At the same time, as shown in FIGS. 14(a) and 14(b), the lenses can be equipped along the front frame(1) including the temple pieces, either continuously or separately.

This invention describes the front frame and temple pieces as being made of synthetic resin. These parts, however, can be obtained by metal binding works or pressing works having free styles. With regard to implanted lenses, it is preferrable to use mirror coated lenses therein, however, all kinds of beam attenuating lenses such as, for example, colored lenses, polarized light lenses, and photochromic lenses, can be used.

As explained above, the attachable eyeglasses developed by this invention can eliminate the various uncomfortable effects when using attachable eyeglasses. That is, a large front frame conceals the normal eyeglasses, a brow bracket formed on the upper part of the front frame contacts a wearer's forehead to partly support the weight of the attachable eyeglasses, and an unpleasant feeling experienced by the wearer caused by the double eye glass weight is avoided. As explained above with respect to the second embodiment, extra nose pads are provided on the attachable eyeglasses so that the burden on the wearer's nose is highly reduced. The front frame is large in size which helps to hide the odd protruding of the normal eyeglasses which are already being worn. Fastening means and rib formation prevent the lenses of the attachable eyeglasses and those of the normal eyeglasses from contacting each other and causing damage or cracks in the lenses.

The foregoing is considered as illustrative only of the principles of the invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention and the appended claims and their equivalents.

What is claimed is:

1. Attachable eyeglasses comprising:
   wide front frame means for concealing normal eyeglasses;
   side brackets attached to said wide front frame means, said front frame means comprising:
     plate-type side brackets formed on both ends of said front frame means; and
     fastener means located on inner surfaces of said side brackets for holding temple pieces of the normal eyeglasses; and
   brow bracket means formed on an upper portion of said front frame means extending toward and contacting a wearer's forehead for supporting the weight of the attachable eyeglasses.

2. Attachable eyeglasses to be worn over normal eyeglasses, comprising:
   wide front frame means worn over normal eyeglasses for concealing the normal eyeglasses;
   brow bracket means formed on an upper portion of said front frame means extending toward and contacting a wearer's forehead for supporting the weight of the attachable eyeglasses;

bumper means, on said brow bracket means and composed of soft synthetic resin material, for cushioning the wearer's forehead; and wide-type temple pieces formed on both sides of said front frame means, said wide-type temple pieces being foldable via hinge means located where said front frame means and said wide-type temple pieces meet.

3. Attachable eyeglasses according to claim 2, wherein said bumper means includes recess means formed between said brow bracket means and the normal eyeglasses for keeping a fixed distance between the normal eyeglasses and the attachable eyeglasses.

4. Attachable eyeglasses according to claim 2, wherein said wide-type temple pieces formed on both sides of said front frame means include lens portions formed therein.

* * * * *